Sept. 13, 1932.    M. FERRIS    1,877,287
STANDARD SIGNAL GENERATOR
Filed July 13, 1929    3 Sheets-Sheet 3

Patented Sept. 13, 1932

1,877,287

UNITED STATES PATENT OFFICE

MALCOLM FERRIS, OF BOONTON, NEW JERSEY, ASSIGNOR, BY MESNE ASSIGNMENTS, TO RADIO CORPORATION OF AMERICA, OF NEW YORK, N. Y., A CORPORATION OF DELAWARE

STANDARD SIGNAL GENERATOR

Application filed July 13, 1929. Serial No. 378,091.

This invention relates to apparatus for radio measurements, and more particularly to apparatus for the generation of radio frequency signals of known strength.

In the measurement of field strength and in the testing of radio receivers, a controlled source of radio frequency signals of known strength is essential. The "standard" signal generators which have been employed for such work have been, in most cases, comparatively crude and the operations have been complicated since calculations were required to determine the output.

An object of the present invention is to provide apparatus for the generation of signals of known radio frequency microvoltages. An object is to provide apparatus for use in the testing of radio receivers to determine, quantitatively, their performance, and particularly their sensitivity, selectivity and fidelity of reproduction.

A further object is to provide a source of radio frequency signals of predetermined and controlled radio frequency voltages and having a predetermined and controlled percentage of modulation. A further object is to provide a signal generator of the type stated in which all parts except, if desired, the energizing batteries, may be located in shielded housing or box, the construction being such that the only radio frequency output from the shielded housing is the measured and accurately predetermined output which is available at the output signal terminals of the generator. Further objects are to improve the shielding of and between the component parts of the oscillation generator, and particularly the shielding of the attenuator which is employed to vary the magnitude of the radio frequency output.

Figure 1:
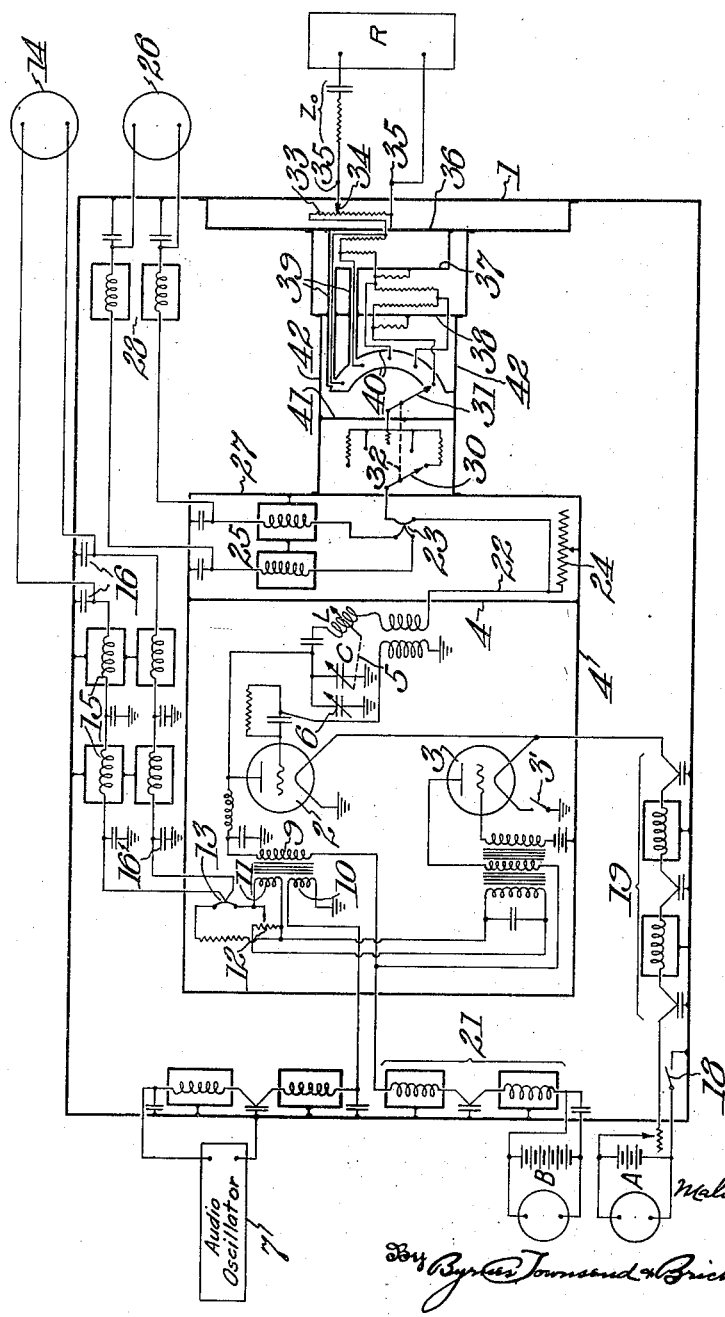
Figure 2:
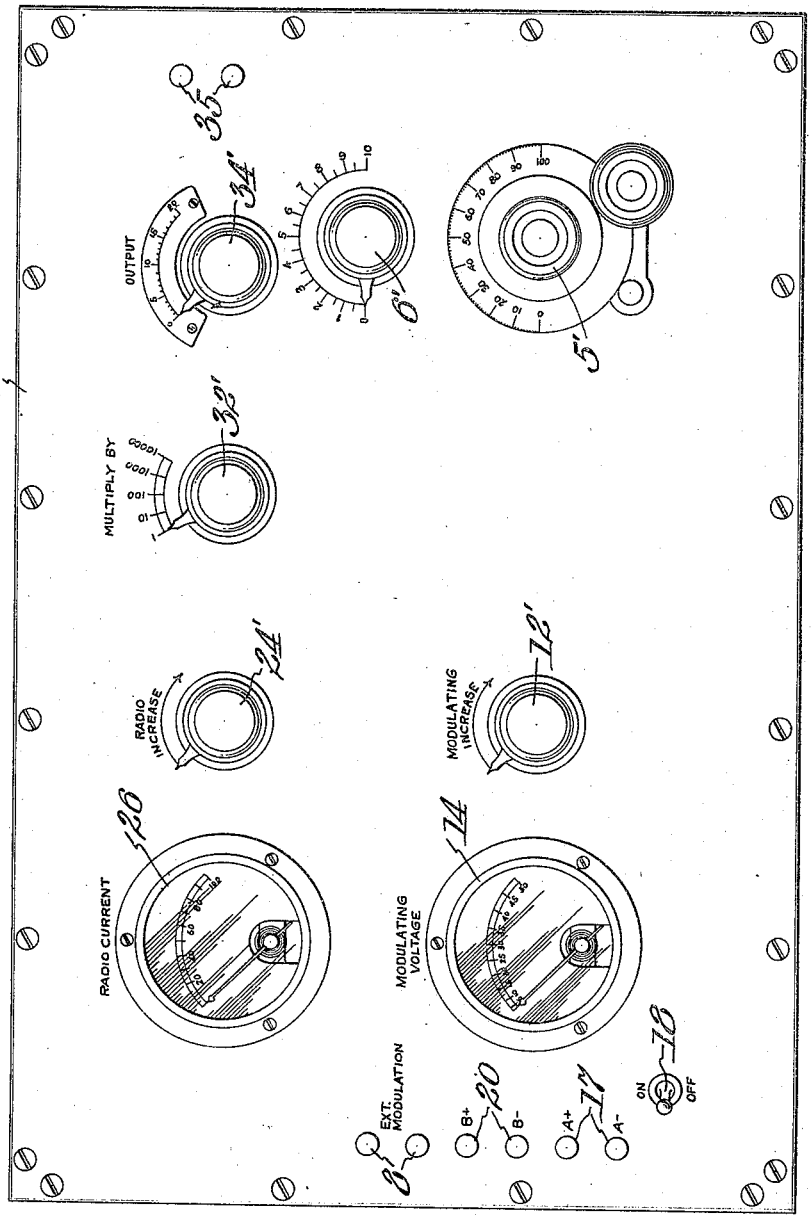
Figure 3:
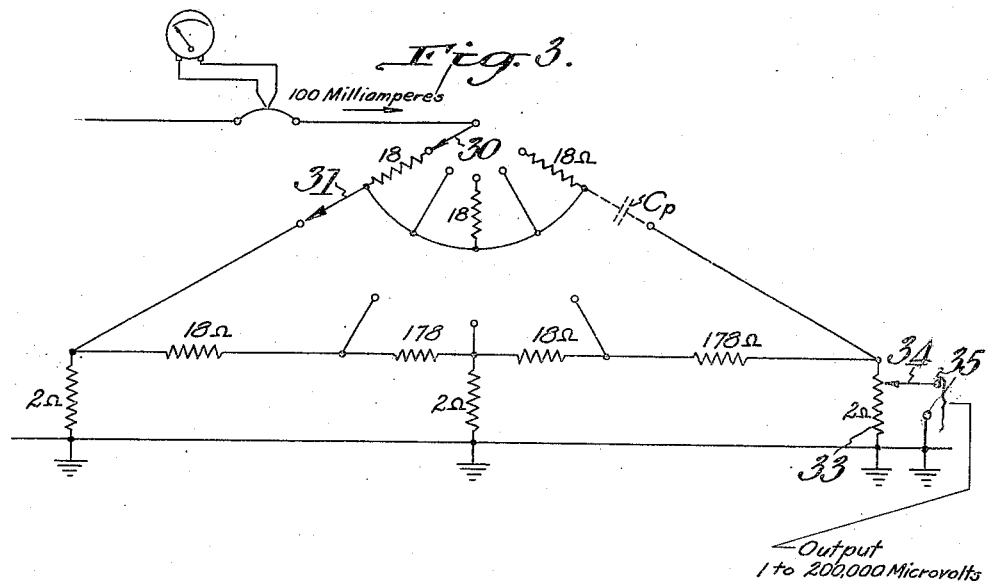
Figure 4:
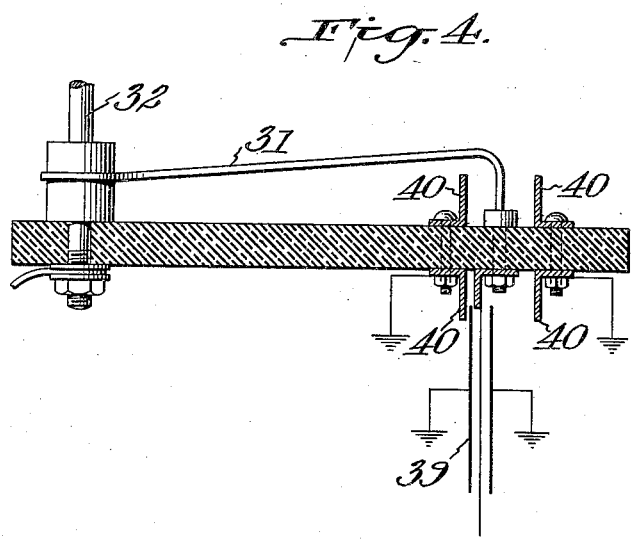

These and other objects of the invention will be apparent from the following description when taken with the accompanying drawings, in which Fig. 1 is a diagrammatic representation of the electrical circuits and the shielding employed in one form of signal generator embodying the invention, Fig. 2 is a front elevation of the instrument panel for the same, Fig. 3 is a circuit diagram of a voltage attenuator system, and Fig. 4 is a side elevation, with parts shown in section, of the shielded attenuator switch.

Before proceeding with the description of the apparatus, attention is directed to the fact that there is no problem involved in the design and construction of an oscillator for producing modulated or unmodulated radio frequency signals, since the design, construction and operation of such oscillators are well known in the art. The real problem relates to the production of signals of predetermined and adjustable magnitude. In the testing of radio receivers, standard signals of as low as one microvolt are desired, but it is impossible to make a direct and accurate measurement of voltages of this order of magnitude.

In accordance with the present invention, a signal generator, which is or may be of any conventional design, is associated with electrical indicating instruments of the ordinary type and with graduated adjustable devices, the entire assembly being so constructed and arranged that the signal energy available at the output terminals of the generator assembly may be set at any desired and accurately predetermined value by an appropriate adjustment (as indicated by the graduations) of the variable devices, and that substantially no signal energy will escape from the generator as "stray" energy. As will be explained hereinafter, the solution of the problem is based primarily upon the employment of shielding and filtering of a highly developed character.

In Fig. 1 of the drawings, the main shield or casing which houses the entire assembly, is indicated by the reference numeral 1; the radio frequency oscillator tube 2, the audio frequency oscillator or modulating tube 3, and the associated circuits are housed within a shield 4 which comprises a complete housing located within the outer housing 1.

As indicated above, the particular circuits employed in connection with these oscillators are capable of wide variation and in the embodiment which is shown by way of illustration, the radio frequency oscillator includes a plate circuit in which the inductance L and capacity C may be simultaneously varied by a common operating shaft 5. This arrangement is not necessary, but is preferable since it allows a design which will give a substantially constant output current at various wavelengths and thus requires only minor adjustments of the control rheostat when the wavelength is shifted. For close adjustment of the wavelength, the capacity C may be shunted by a vernier control 6. The signal may be modulated by energy from audio frequency oscillator 7 which may be connected across the appropriate terminals 8, 8, on the panel. The plate circuit of the radio frequency oscillator includes the secondary 9 of a transformer having a primary 10 for association with the external oscillator and a primary 11 which is connected across the voltage divider 12 in the output circuit of the audio oscillator 3.

A thermo-couple 13 is connected across the transformer winding 11 and located within the inner housing 4. The leads from the thermo-couple to the voltmeter 14 are located in the space between the housings 1 and 4, and include series chokes 15 and shunt capacities 16. Filament current for both tubes is supplied from an external battery A which may be connected across the terminals 17 of the panel, the negative lead being grounded through the control switch 18 and the positive lead including a filter 19 which is located between the two casings. Plate current is supplied from an external battery B connected across terminals 20 and the positive lead includes the filter 21 in the space between the casings.

The output from the oscillator tube 2 is through lead 22 and thermo-couple 23 to the voltage attenuator, an adjustable resistance 24 being provided for regulating the current passed through the thermo-couple and attenuator. The lead 22, thermo-couple 23 and resistance 24, as well as a part of the filter 25, in the leads to the ammeter 26 are shielded by a housing 27 which is completely enclosed by a main housing 1. The second section 28 of the filter in the ammeter leads lies between the shield 27 and the main housing 1.

The voltage attenuator comprises a network of resistances and a pair of switches including the switch arms 30 and 31 which are connected for simultaneous operation by a rod 32, the terminal resistance of the network being a slide wire 33 along which a contact 34 may be adjusted. Binding posts or other appropriate terminals 35 on the front panel of the apparatus are connected to slide wire 33 and contact 34 to serve as output terminals for the generator.

The relative values of the resistances and their connections to the switch points are such that movement of switch arms 30, 31 from one position to an adjacent one will result in a decimal change of the voltage across the slide wire. As shown in Fig. 1, the switch is so positioned that the minimum voltage is available at the output, and this voltage will be multiplied by ten for each step that the switch is advanced.

I have found that the voltage output at the terminal resistance of the attenuator, i. e., the slide wire 33, may be predetermined from the signal energy input and the setting of the attenuator switches when the attenuator is adequately shielded. The perfection of shielding which is essential for satisfactory operation is, however, of an order decidedly higher than anything previously employed.

The slide wire 33 is positioned adjacent one wall of the outer casing 1, being preferably located just back of the front wall or panel 1' of the casing, and is shielded by the subpanel 36 which is of substantially greater extent than the slide wire. A shell 37 cooperates with the subpanel 36 to provide a shield for the two preceding elements of the resistance network, the three preceding resistance elements being shielded by the shell 38 which houses the shell 37. The leads to the two terminal sections of the attenuator are shielded by tubes or braid 39, see Fig. 4, and arcuate plates 40 are provided at both sides of the switch points to avoid any substantial capacitive coupling between the switch arm 31 and the contacts. The two switches are separated by a shield 41 which cooperates with plates 42, inner casing 4 and shells 37, 38, to complete the housing or shield for the attenuator. It is to be noted that the shield 37 for the term had or lower voltage section of the attenuator network is located within the shell 38 which houses a higher voltage section, and that the lead to the slide wire is brought out of the attenuator shield at a point on subpanel 36 which is within the double shield.

The front panel 1' may be of metal, for example aluminum, and form a part of the main housing. The particular panel arrangement which is shown in Fig. 2 has been employed with a generator having the circuit arrangement shown in Fig. 1. The instruments and terminals are identified by the reference numerals of the Fig. 1 diagram, and the operating knobs and dials are identified by prime numerals corresponding to the numerals of the respective adjustable elements of the circuit.

As shown in Fig. 1, a radio receiver R is connected across the output terminals 35 of the generator through the composite impedance $Z_0$ which simulates an antenna impedance.

The operation of the generator is characterized by its extreme simplicity. The batteries, the receiver R and the audio oscillator 7, when one is used, may be located in any convenient position. Upon closing switch 18, the radio oscillator 2 is energized and the wavelength of the generated signals may be adjusted by dial 5' and pointer 6'. For continuous wave or for external modulation, switch 3' remains open; for internal modulation, the switch 3' is closed to energize the audio oscillator 3. The modulating voltage, as indicated by the instrument 14, may be adjusted to the desired value by knob 12' in the case of internal modulation and by the usual control devices forming part of the oscillator 7 when external modulation is employed.

The signal energy delivered to the attenuator is adjusted, by knob 24' and rheostat 24, to a definite value, say 100 milliamperes, which is indicated by the milliammeter 26. The voltage available at the output terminals is determined by the adjustment of the switch knob 32' and slide wire knob 34', and its measured value, in microvolts, is equal to the product of values indicated on the scales associated with these knobs.

For the particular values indicated upon the panel, the resistances of the elements of the attenuator network will have the respective values indicated on the schematic diagram of Fig. 3, and the measured output may be varied between 1 and 200,000 microvolts.

The necessity for substantially perfect shielding will be apparent from a consideration of Fig. 3. A mathematical analysis of the resistance network shows that when the switch arms are set to establish the minimum voltage across the slide wire, the current established in the slide wire by the conductive network is only 10 microamperes and that an error of one percent would be introduced if the phantom capacity $C_p$ between the slide wire tap and switch arm 31 were as great as ½ mmf. The resistance elements of the network are, of course, non-inductive and may be wound of #38 Manganin wire, or smaller.

While the invention is not limited to the employment of circuit elements or of currents of the values stated above, these values have been found to be satisfactory for a generator intended for the testing of radio broadcast receivers. Normal output may be had with most receivers when the detector input is 200,000 microvolts. With an input of 100 milliamperes into the attenuator, a relatively rugged type of switchboard instrument is satisfactory. A much smaller current would make necessary the use of a more delicate measuring instrument, and would limit the maximum output across the slide wire. An appreciably greater current would necessitate a more powerful oscillator and would render the design and mechanical construction of the shielding more difficult.

While the mechanical arrangement of the shields may be varied to a considerable extent, I believe that to secure a compact construction in a generator delivering accurately measured voltages of the order of microvolts, the following features are of primary importance:

(a) An inner shield for the radio frequency oscillator;

(b) All battery and instrument leads must be carefully filtered, the filter elements being located between the inner and outer shields;

(c) An attenuator shield between the attenuator and other circuit elements which are located between the inner and outer shields;

(d) An inner shield separating the lower voltage sections of the attenuator for the other elements located within the main attenuator shield, the output lead passing from the main attenuator shield at a point which is within both attenuator shields;

(e) Shielding between the ganged switches, when a plurality of switches are employed in the attenuator, and shielding between the terminal switch arms and its contacts;

(f) Control shafts grounded to both the inner and outer shields of the oscillator, and broken by insulating couplings.

By giving due consideration to these factors, the voltage across the slide wire has the value indicated by the instrument settings, and all computations and indirect measuring methods are avoided. The perfection of filtering and shielding is, of course, dependent upon the degree of accuracy which is required. For relatively low maximum outputs and/or where high accuracy is not necessary, all of the precautions noted above are not essential.

It is therefore to be understood that the invention is not restricted to the specific embodiment which I have described, since various changes, substitutions or omissions may be made without departing from the spirit of my invention as set forth in the following claims.

I claim:

1. The combination with an oscillator for generating radio frequency signals, a voltage attenuator comprising a resistance network and an adjusting switch therefor, and means including an indicating instrument for adjusting the signal energy delivered to said attenuator to a predetermined value; of metallic spaced casings providing a double shield about said oscillator, a metallic casing positioned in the interspace of said double shield casings and providing a shield for said attenuator, and shields within said last-mentioned casing for substantially eliminating coupling between the terminal resistance thereof and the other parts of said attenuator, whereby the voltage available across said terminal resistance is predetermined by the adjustment of said attenuator switch.

2. The invention as set forth in claim 1, in combination with a source of current supply exterior to said double shield for energizing said oscillator, and a filter network located in the interspace of said double shield for preventing signal energy from passing outside said double shield by way of said current supply leads.

3. The invention as set forth in claim 1, in combination with an audio frequency oscillator for modulating the generated radio frequency signal, said oscillator being located within the inner casing of said double shield.

4. The invention as set forth in claim 1, in combination with an audio frequency oscillator located outside of said double shield, circuit connections between said audio and radio frequency oscillator, said circuit connections including filters positioned within the interspace of said double shield.

5. In a standard signal generator, the combination with an oscillator for generating radio frequency signals, and metallic shields preventing the escape of stray signal energy from said generator, of a voltage attenuator comprising a plurality of resistance elements and a pair of multipoint switches, of a shield preventing coupling between said switches, shields enclosing the terminal resistance elements of said network and the leads connecting said terminal elements with their respective switch contacts, and a shield cooperating with said switch contacts to substantially eliminate electrostatic coupling between said switch contacts and their associated switch arm.

6. In a standard signal generator, the combination of an oscillator for generating radio frequency signals, and an inner and outer shield housing said oscillator, said inner and outer shields being in spaced relationship, of measuring instruments carried by a panel of said outer shield, leads extending between said instruments and said oscillator, filter elements in said leads and located between said shields.

7. The invention as set forth in claim 6, in combination with terminals at the exterior of said outer shield for connection to sources of current supply, leads extending from said terminals to said oscillator and including filter elements located in the space between said shields.

8. In a standard signal generator, the combination with an oscillator and spaced inner and outer shields housing the same, of a voltage attenuator network positioned in the space between said shields, a metallic housing enclosing said attenuator, and a metallic shield within said housing and separating the low voltage resistance elements from the higher voltage resistance elements, a switch for establishing connection between said oscillator and points in said network, and shields housing the leads from said switch to the lower voltage elements of said network.

9. A voltage attenuator for a standard signal generator comprising a slide wire and a plurality of resistance elements, a shield for said slide wire, a metallic casing enclosing said elements, a shield within said casing and separating the lower voltage resistance elements from the preceding elements, and a lead from said low voltage elements to said slide wire, said lead extending from said housing at a point within both said shield and said housing.

In testimony whereof, I affix my signature.

MALCOLM FERRIS.

CERTIFICATE OF CORRECTION.

Patent No. 1,877,287.   September 13, 1932.

MALCOLM FERRIS.

It is hereby certified that error appears in the printed specification of the above numbered patent requiring correction as follows: Page 2, line 101, for the words "term had" read "terminal"; and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.